US007257585B2

(12) United States Patent
Stevenson et al.

(10) Patent No.: US 7,257,585 B2
(45) Date of Patent: Aug. 14, 2007

(54) METHOD AND SYSTEM FOR AUGMENTING WEB CONTENT

(75) Inventors: Douglas Stevenson, San Francisco, CA (US); Craig Allen Gooding, London (GB)

(73) Assignee: Vibrant Media Limited, London (GB)

( * ) Notice: Subject to any disclaimer, the term of this patent is extended or adjusted under 35 U.S.C. 154(b) by 0 days.

(21) Appl. No.: 10/645,313

(22) Filed: Aug. 20, 2003

(65) Prior Publication Data

US 2005/0004909 A1    Jan. 6, 2005

Related U.S. Application Data

(60) Provisional application No. 60/484,818, filed on Jul. 2, 2003.

(51) Int. Cl.
*G06F 7/00* (2006.01)
*G06F 17/00* (2006.01)
*G06F 17/30* (2006.01)
*G06F 12/00* (2006.01)

(52) U.S. Cl. .................. 707/100; 707/10; 707/101; 707/200

(58) Field of Classification Search ............... 707/5, 707/100, 10, 101, 200; 709/219; 706/52; 704/7
See application file for complete search history.

(56) References Cited

U.S. PATENT DOCUMENTS

| 5,603,025 | A | * | 2/1997 | Tabb et al. ................... 707/2 |
| 5,764,906 | A | * | 6/1998 | Edelstein et al. ........... 709/219 |
| 5,903,889 | A | | 5/1999 | De La Huerga et al. |
| 6,098,065 | A | * | 8/2000 | Skillen et al. ................ 707/3 |
| 6,434,657 | B1 | | 8/2002 | Brown |
| 6,507,837 | B1 | | 1/2003 | De La Huerga |
| 6,516,321 | B1 | | 2/2003 | De La Huerga |
| 6,578,078 | B1 | * | 6/2003 | Smith et al. ................ 709/224 |
| 6,606,652 | B1 | | 8/2003 | Cohn et al. |
| 2002/0065136 | A1 | * | 5/2002 | Day ............................. 463/42 |
| 2002/0143808 | A1 | | 10/2002 | Miller et al. |

FOREIGN PATENT DOCUMENTS

EP    0778534 A1    6/1997

(Continued)

OTHER PUBLICATIONS

International Search Report for WO 2001/086390 A3.

(Continued)

*Primary Examiner*—Don Wong
*Assistant Examiner*—Cheryl M Shechtman
(74) *Attorney, Agent, or Firm*—Fenwick & West LLP

(57) ABSTRACT

A system for augmenting data from a source data file with data from a reference database to generate an augmented data file is provided. The system includes a reference database including at least one reference datum. A handler component is configured to retrieve a source data file including the structured datum. A locator component is configured to locate the structured datum in the source data file; an analyzer component configured to associate the identified structured datum to one reference datum to create an association according to an analyzing strategy. A generating component is configured to generate a hyperlink based upon the association and embeds the generated hyperlink in the source file to create an augmented data file.

82 Claims, 8 Drawing Sheets

FOREIGN PATENT DOCUMENTS

| | | |
|---|---|---|
| EP | 0810520 A1 | 12/1997 |
| WO | WO 97/21183 A1 | 6/1997 |
| WO | WO 98/34168 A2 | 8/1998 |
| WO | WO 01/42947 A2 | 6/2001 |
| WO | WO 01/86390 * | 11/2001 |

OTHER PUBLICATIONS

Notification Of Transmittal Of The International Search Report And The Written Opinion Of The International Searching Authority, or the Declaration, PCT/US2004/021294, Feb. 14, 2005.

European Search Report, EP 04 75 6575, Aug. 16, 2006, 3 pages.

Wyman, B., "Random Link Insertion into a Webpage," Computer Language Javascript, Sep. 25, 1996, [online] [Retrieved on Jul. 31, 2006] Retrieved from the Internet <URL:http://groups.google.com/group/comp.lang.javascript/browse_thread>.

File History of U.S. Appl. No. 09/606,422, filed Jun. 29, 2000, 410 pages.

File History of U.S. Appl. No. 11/267,873, filed Nov. 4, 2005, 247 pages.

* cited by examiner

107

Sounds like you stopped it dead in its tracks. You could do a second virus scan at HOUSE CALL at the Trend Micro website if that would ease your mind. Brian, if you are going to use KAZAA, remember to be very cautious and scan evrything. As many people that try to help people at this security area know full well, there are virus/trojans/worms that are only available by using KAZAA!

Sounds like you stopped it dead in its tracks. You could do a second virus scan at HOUSE CALL at the Trend Micro website if that would ease your mind. Brian, if you are going to use KAZAA, remember to be very cautious and scan —111 evrything. As many people that try to help people at this <u>security</u> area know full well, there are virus/ trojans/worms that are only available by using KAZAA!

FIG. 5

| 121 | | | | | | | | 124 | |
|---|---|---|---|---|---|---|---|---|---|
| music | * | | * | | * | | Have Fun with Lola. | http://www.x10.com/products/lola_sg1.htm | |
| security | | * | | * | | * | Cisco. This is the power of the network. Now. | http://www.cisco.com/ | |
| surveilance | | | | | | | Vanguard: The Ultimate Camera | http://www.x10.com/products/vanguard_sg1.htm?|x10van1 | |

FIG. 6

METHOD AND SYSTEM FOR AUGMENTING WEB CONTENT

PRIORITY CLAIM

This application claims priority to provisional patent application 60/484,818 filed on Jul. 2, 2003.

BACKGROUND OF THE INVENTION

Hypertext is the organization of computer-based text into connected associations enabling a user to quickly access information that the user chooses. An instance of such an association is called a hyperlink or hypertext link. Hypertext was the main concept that led to the invention of the World Wide Web, which is nothing more than an enormous amount of information content connected by an enormous number of hyperlinks.

While the hyperlink has proven to be a successful means of relating two pieces of information, the process of generating hyperlinks has proven to be generally tedious. To create a single link, the process requires an author to define such portions, usually a text string or photo element of a structured file (usually a text document, web page, or other form of document) from which the hyperlink originates and a destination address at which the hyperlink terminates. In a closed system such as in a local network of workstations, the destination might be within the same file, directory, or computer, or the destination may be a designated file within a designated directory on the network.

Even with the required information, the knitting together of hyperlinks still requires some skill. The would-be author of a document with suitable links must first identify the content of the file the author seeks to augment and then must use an appropriate application to edit the file. Generally, the MIME header embedded in the file identifies the file type. The embedded header allows a computer software product to recognize the data by virtue of its Multi-Purpose Internet Mail Extensions ("MIME") type. MIME is an extension of the original Internet e-mail protocol that lets people use the protocol to exchange different kinds of data files on the Internet including audio, video, images, application programs, and other kinds, including text generally in the ASCII format. Once identified, the file is opened for review using the appropriate application as identified by the MIME header.

When the network is broader, such as on the Internet, static addresses on the Internet may be used as destinations. A Uniform Resource Locator is the address of a file (resource) accessible on the Internet. The type of resource depends on the Internet application protocol. Using the World Wide Web's protocol, Hypertext Transfer Protocol (HTTP), the resource can be an HTML page, an image file, a program such as a common gateway interface application or Java applet, or any other file type supported by HTTP. The URL contains the name of the protocol required to access the resource, a domain name that identifies a specific computer on the Internet, and presents a hierarchical description of a file location on the computer.

For this reason, the content of resources may not have all of the links that would be useful. Old data might direct browsers to addresses where no data is now stored. "Link rot," describes a gradual loss of data at URL's linked to documents. This gradual loss occurs when a destination document is removed while the link in an originating document to the destination document remains. The reader receives a "404 message," an arbitrarily assigned code indicating that the page to which the reader has directed the browser no longer exists at the designated address. Another form of link rot occurs when the destination page has been changed in content and is no longer relevant according to the sending description.

Where parties, such as advertisers, wish to inject links into existing resources in order to direct the reader's browser to designated resources, it is critical that the links remain current. Because files are static, links that are old will not complete the hyperlink transit and therefore will lose the benefit of the hyperlink. Fixedly embedding links in the file subjects the file to link rot.

There is, therefore, an unmet need in the art for a publishing system and method for augmenting resources and maintaining suitable current hyperlinks within the resources.

SUMMARY OF THE INVENTION

A system for augmenting data from a source data file with data from a reference database to generate an augmented data file is provided. The system includes a reference database including at least one reference datum. A handler component is configured to retrieve a source data file including the structured datum. A locator component is configured to locate the structured datum in the source data file; an analyzer component configured to associate the identified structured datum to one reference datum to create an association according to an analyzing strategy. A generating component is configured to generate a hyperlink based upon the association and embeds the generated hyperlink in the source file to create an augmented data file.

One presently preferred embodiment includes a system for augmenting file content, including web content, with hyperlinks to designated destinations. The system works based on finding a datum (a data subset of a file) within a file, recognizing the datum based upon the contents of a reference database, associating the datum with a designated resource (in a presently preferred embodiment by means of a uniform resource locator address) and generating a hyperlink in the data source file.

The generated hyperlink (in a presently preferred embodiment) receives a user-friendly name based on the contents of the resource located at the uniform resource locator address. The an embodiment is a add-on to a browser allowing the browser to augment files "on the fly," i.e. where the user directs the browser to a resource located on a network, the method analyzes the file as it is opened by the browser, augments the file with appropriate hyperlinks, and displays the augmented file with active hyperlinks. "Clicking on" the hyperlink will redirect the browser to the associated uniform resource locator address.

Another presently preferred embodiment provides a rigorous procedure for augmenting files that assures that a greater number of hyperlinks are more uniformly applied than is the rule with human authoring of hyperlinks. A reference database can check the content of the file and will always place a hyperlink where appropriate based upon context. Because the reference database can be readily updated, the invention assures that redirection to current resources, preventing the dead link, i.e. "Error 404, file not found."

A presently preferred embodiment provides a method and a software product to add advertisements to existing web content by hyperlinking occurrences of structured data such as text strings to resources located at a uniform resource locator address.

As will be readily appreciated from the foregoing summary, the invention provides a system and a method for rapidly and for rigorously augmenting files with hyperlinks.

BRIEF DESCRIPTION OF THE DRAWINGS

The preferred and alternative embodiments of the present invention are described in detail below with reference to the following drawings.

FIG. 4 is a block of text selected for augmentation;

FIG. 5 is the block of text selected for augmentation based upon the occurrence of a text string;

FIG. 6 is an excerpt of an exemplary reference database;

DETAILED DESCRIPTION OF THE INVENTION

By way of overview, a system for augmenting data from a source data file with data from a reference database to generate an augmented data file is provided. The system includes a reference database including at least one reference datum. A handler component is configured to retrieve a source data file including the structured datum. A locator component is configured to locate the structured datum in the source data file; an analyzer component configured to associate the identified structured datum to one reference datum to create an association according to an analyzing strategy. A generating component is configured to generate a hyperlink based upon the association and embeds the generated hyperlink in the source file to create an augmented data file.

Figure 1:
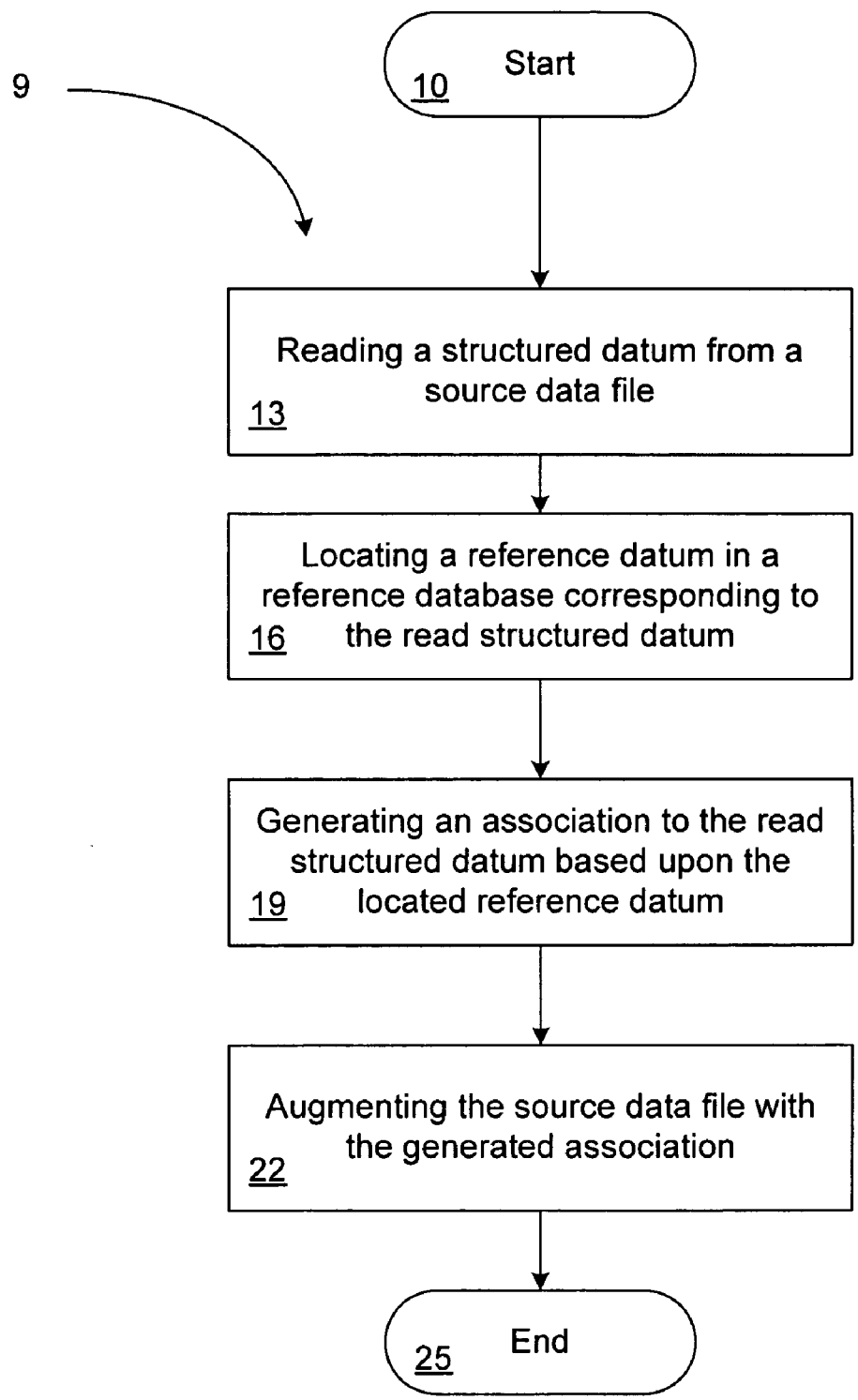
FIG. 1 is a flowchart of the method for augmenting source data files.

FIG. 1 is a flowchart of the method 9 for augmenting source data files. At an appropriate starting terminus 10, the method begins by reading a structured datum from a source data file at a block 13. The source data file may be one designated by an input uniform resource locator address or by any suitable means to designate a resource. Upon opening, the method 9 may optionally identify the type of content on the page with a content identifier such as a MIME header. In one embodiment of the invention, the method 9 merely searches for the presence of a reference datum, either informed by the content identifier or by simply searching an occurrence of a well-structured datum within a given file. However, once the file is open, the method has the contents of the file available for comparison to a reference database.

At a block 16, the method 9 locates an occurrence of a reference datum corresponding to the structured datum read in the source data file. One presently preferred means of discerning the correspondent relation between the structured datum and the reference datum is by a JavaScript call made to a web-enabled database. The Java script then compares the contents of the source data file with reference data stored in a web-enabled reference database. In one presently preferred embodiment, the reference and structured data are keywords. The JavaScript code then extracts the text from the document and converts all of the keywords in the document to hyperlinks.

Other analyzing strategies are also available. Though keywords are a facile and efficient means of generating hyperlinks. One presently preferred embodiment uses a "fuzzy expert" or a neural network analysis of the source data file, such as by a natural language search of the document to generate a distinct identifier for the content in the source data file. One advantage of a natural language search is the ability to better place content in context making links more contextually appropriate, for instance, security might relate to security of a physical plant such as security of a residence in one source data file in one context and security of a website in another. Natural language searches, however, create a large processing overhead, making them less desirable where such resources are at a premium.

At a block 19, the method 9 generates an association based upon the located reference datum in the reference database. The reference datum will include not only the identifier, such as a keyword in one embodiment, but also the associated uniform resource locator address of the intended destination based upon the occurrence of the identifier in the source data file. Generating an association means to hyperlink the located structured datum in the source data file to the associated uniform resource locator as found in the reference datum in the reference database. The generated hyperlink might optionally include a user-friendly description of the content of the resource found at the associated uniform resource locator address and additionally might include an additional identification code such as an "advertiser id." In each embodiment, the generated hyperlink is added to the original source data file at a block 22 resulting in an augmented data file. Having generated the augmented data file, the method 9 then terminates at a block 25.

Figure 2:
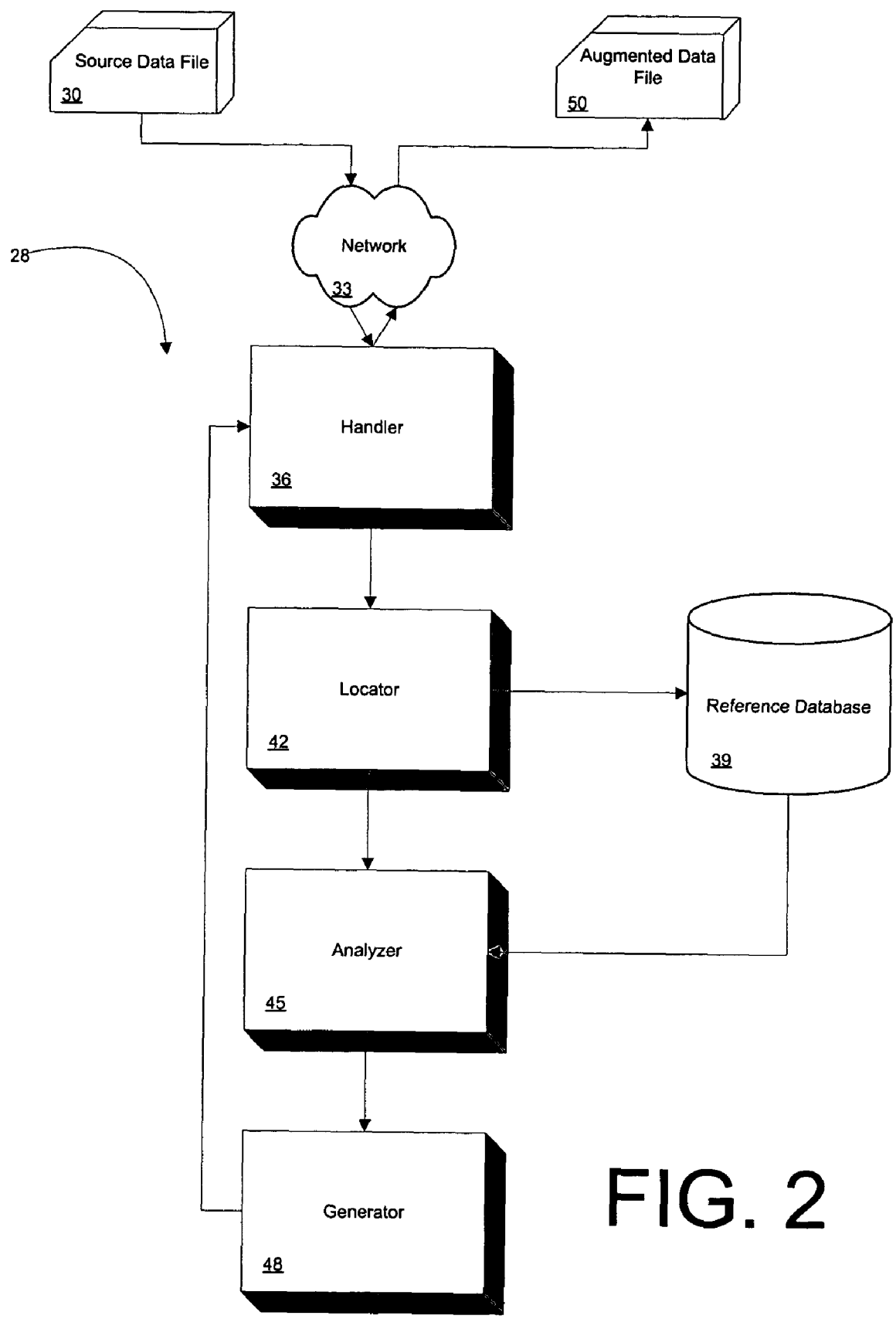
FIG. 2 is a block diagram of a system for augmenting source data files.

FIG. 2 is a block diagram of a system for augmenting source data files. In this exemplary system, a network 33 is shown in a presently preferred embodiment. Those skilled in the relevant art will readily appreciate that the system may be practiced without the presence of a network link. Also a reference database 39 is shown as directly connected to the locator 42 and the analyzer 45. The system is not compromised by network links to any of the several components. One presently preferred embodiment has the reference database 39 set on a web-enabled page for remote calls through the Internet to the database. Like the presence of the network 33 described above, the absence of a defined link through the Internet does not compromise the operation of the method.

A source data file 30 resides on a server on a network 33. A handler 36 retrieves the source data file 30 for use by the system. A locator 42 examines the retrieved source data file 30 for comparison to the reference database 39 according to an analyzing strategy. The locator 42 designates found structured data from the source data file 30 and found reference data from the reference database 39 and provides the reference data to an analyzer 45.

The analyzer 45 is used to create associations between each found structured datum and the uniform resource locator address within the corresponding reference datum found by the locator 42. These associations define the nature of a hyperlink a generator 48 generates according to the association created at the analyzer 45. The generator 48 embeds these hyperlinks in the source data file 30. The resulting augmented data file 50 is returned to the handler 36 to reside at a uniform resource locator address on the network 33.

Figure 3:
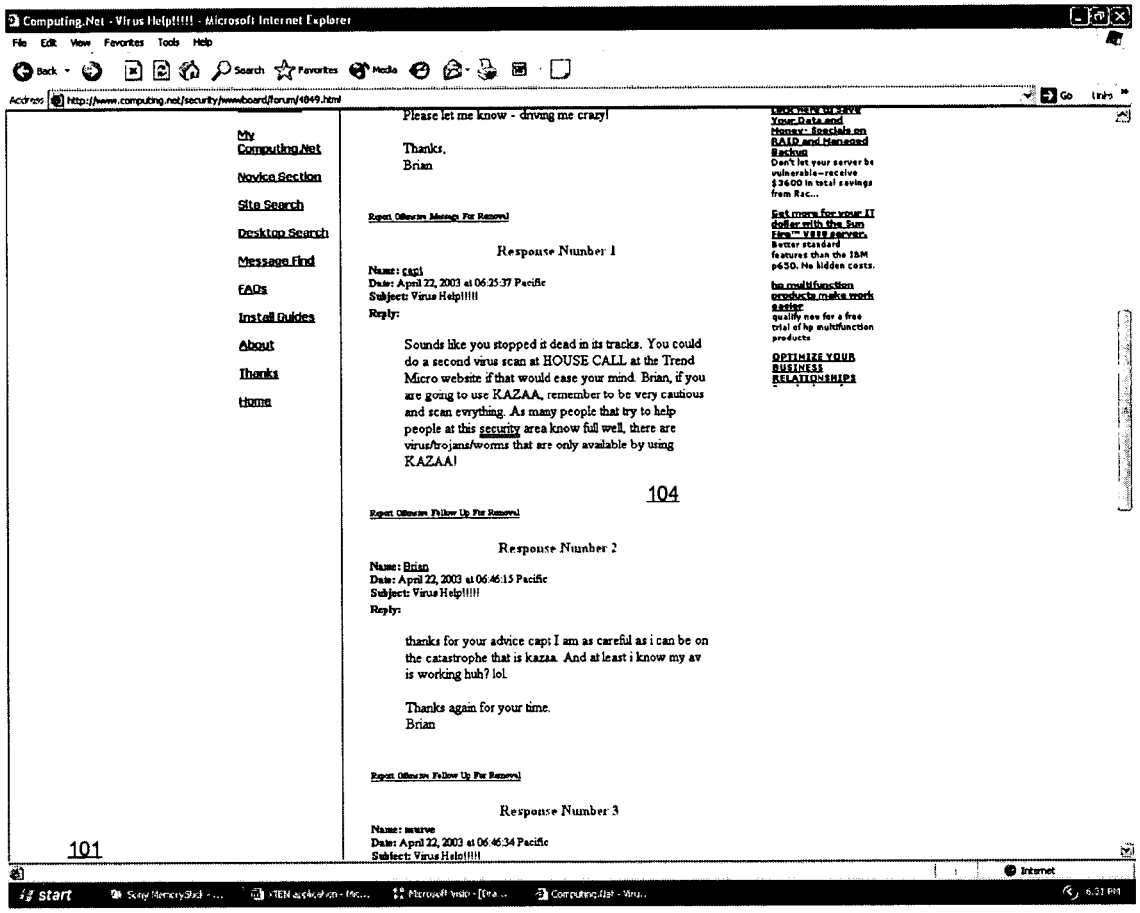
FIG. 3 is screen shot of a source data file selected for augmentation.

FIG. 3 is a screen shot 101 of contents of a source data file 30 (FIG. 2) selected for augmentation. For the purposes of this exemplary discussion, a block of text 104 is selected by the method for augmentation. The present invention does not require the opening of the source data file 30 in a browser however for the purposes of illustration, the screen shot 101 is provided herein.

FIG. 4 is a block of text 107 selected for augmentation. The locator 42 (FIG. 2) begins its analysis of the selected block by isolating the block of text 107 as structured data.

FIG. 5 is the block of text 107 selected for augmentation indicating the occurrence of a text string 111. The locator 42 isolates the occurrence of the text string 111 because of its presence in the reference database 39.

Referring to FIGS. 2 and 6, while the excerpt 115 of the exemplary reference database 39 shows it to be a "flat file" database, any database 39, relational, flat file, or other configuration will suitably fulfill the basic functions of associating an identifier such as a text string 118, with a uniform resource locator address 124, and optionally a user-friendly description 121 of the contents of the file found at the associated uniform resource locator address 124. (Not shown is the optional "advertiser id.")

The locator 42 (FIG. 2) refers to the database as it reviews the contents of the source data file 30 (FIG. 2). According to the analyzing strategy, the text string 118 occurs at a reference datum in the source data file 30, the locator 42 provides the uniform resource locator 124 associated with the found text string 118 along with the occurrence of the text string in the reference datum to the analyzer 45. Upon receiving the ordered pair from the locator address 42, the analyzer 45 creates the association. With the association from the analyzer 45, the generator 48 creates a hyperlink. As a result, the text block receives the appropriate hyperlink.

Figure 7:
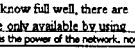
FIG. 7 is a screen shot of the source data file selected for augmentation showing hyperlink and associated user-friendly name.

FIG. 7 is a screen shot 101 of the augmented data file 50 showing the selected block of text 104, hyperlink 129, and associated user-friendly name 133. As will readily be appreciated by those skilled in the relevant art, the augmented data file 50 need not reside on a network. For instance, where a browser is enhanced with the inventive method 9 (FIG. 1), the browser might be directed to content on the Internet. Upon opening the source data file 30 (FIG. 2), the browser will effect the method 9 (FIG. 1) such that rather than displaying the contents of the source data file 30, the browser will display the augmented data file 50. The resulting augmented files 50 would be current at the time of viewing. In a publisher embodiment, the advertiser might continually files on the network, replacing augmented files on the network.

The augmented data file 50 is displayed as set forth in FIG. 7. When a reader places the mouse cursor over the hyperlink 129, a new layer for display showing the associated user-friendly name 133 may be optionally evoked. The "advertiser id" may be optionally embedded but not necessarily visible, the advertiser id. This advertiser id specifically provides a means for tracking the number of times the hyperlink 129 is activated and generating a record for tracking revenue due to advertising. The reader clicks on the hyperlink 129 to direct the browser to a destination file.

Figure 8:
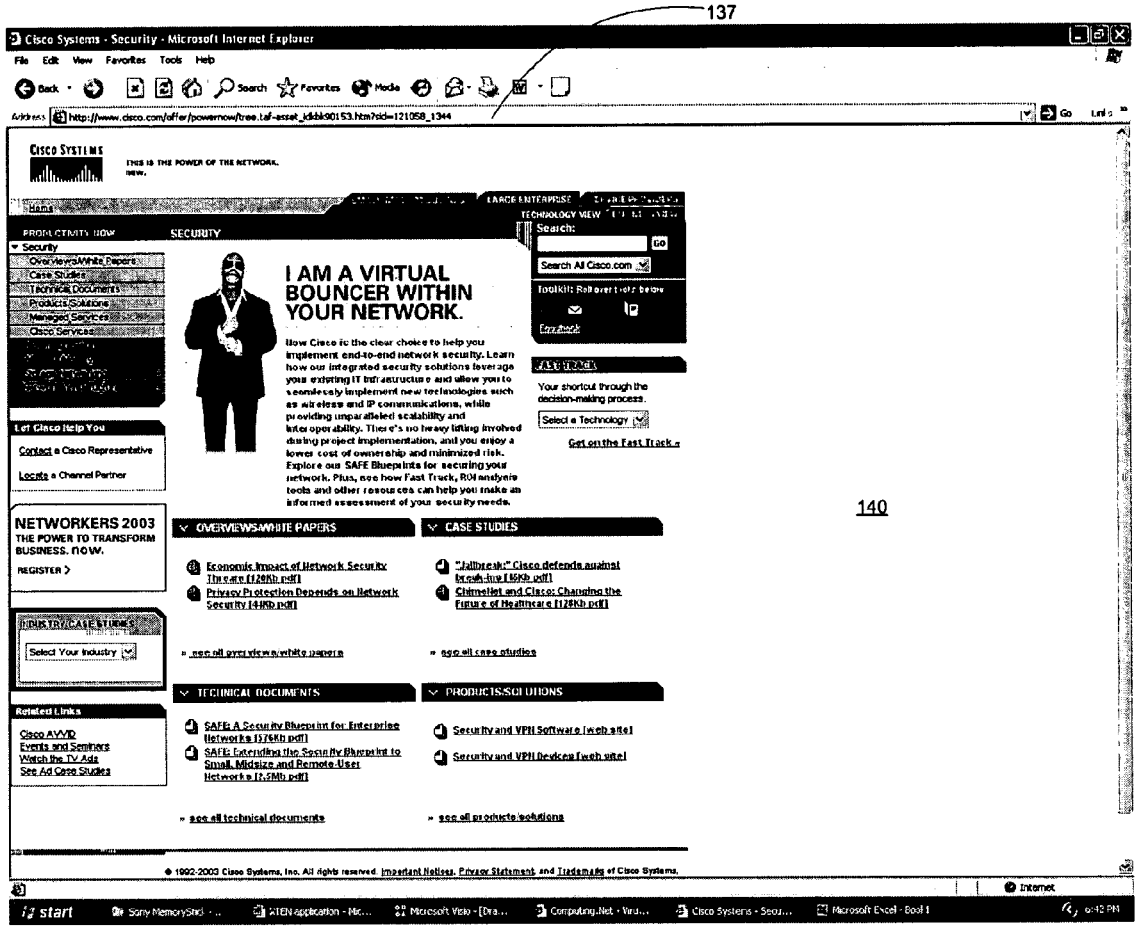
FIG. 8 is a screen shot of the contents of a destination file upon redirection of the browser.

FIG. 8 includes a screen shot 140 of the browser displaying the contents of the destination file located at the uniform resource locator address 137 upon redirection of the browser. When the reader clicks on the hyperlink 129, a new browser window is opened and directed through a click-tracking server to the hyperlink destination.

While the preferred embodiment of the invention has been illustrated and described, as noted above, many changes can be made without departing from the spirit and scope of the invention. For example, the method 9 will generate static files on the network at distinct uniform resource locator addresses 124 and 137 in order to distinguish from the original source data files. Accordingly, the scope of the invention is not limited by the disclosure of the preferred embodiment. Instead, the invention should be determined entirely by reference to the claims that follow.

What is claimed is:

1. A system for augmenting data from a source data file to generate an augmented data file, comprising:
   a reference database including a reference datum;
   a handler component configured to retrieve the source data file, the source data file including a structured datum;
   a locator component configured to locate the structured datum in the source data file;
   an analyzer component configured to associate the structured datum to the reference datum to create an association according to an analyzing strategy;
   a generating component configured to embed the association of the structured datum to the reference datum in the source data file to generate the augmented data file at a first instance; and
   a communication component configured to transmit additional information, wherein:
      the communication component transmits the augmented data file to a computing device,
      receives an identifier at a second instance from the computing device corresponding to a pointer being positioned over the structured datum in the computing device,
      responsive to receiving the identifier, transmits to the computing device additional information from the reference database according to the association, the additional information being displayable as an overlay in an area proximate to the structured datum simultaneously to the pointer being positioned over the structured datum, and
      responsive to receiving the identifier, updates the reference database to track the number of times a pointer is positioned over the structured datum.

2. The system of claim 1, wherein the source data file is stored at an address on a network.

3. The system of claim 2, wherein the network is a public network.

4. The system of claim 3, wherein the network is the Internet.

5. The system of claim 1, wherein the structured datum includes a formatted webpage.

6. The system of claim 1, wherein the reference datum includes a first uniform resource locator address.

7. The system as defined in claim 6, wherein the first uniform resource locator address is the location of an advertisement.

8. The system of claim 7, wherein the reference datum includes a second identifier associated with the first uniform resource locator address.

9. The system of claim 8, wherein the analyzer component is further configured:
   to generate a first identifier based upon the structured datum;
   to locate the second identifier corresponding to the first identifier; and
   to associate the first uniform resource locator address with the structured datum.

10. The system of claim 9, wherein the first uniform resource locator address is further associated with a user-friendly descriptor.

11. The system of claim 9, wherein the first identifier is a first text string.

12. The system of claim 11, wherein the first text string includes keywords.

13. The system of claim 12, wherein the second identifier is a second text string.

14. The system of claim 13, wherein the analyzer component is further configured to locate the second text string according to the first text string.

15. The system of claim 9, wherein the analyzer component generates the first identifier by means of a "fuzzy expert" search engine.

16. The system of claim 9, wherein the analyzer component generates the first identifier by means of a natural language search engine.

17. The system of claim 1, wherein the association of the structured datum to the reference datum in the source data file is embedded as a hyperlink in the augmented data file.

18. The system of claim 1, wherein the additional information comprises a hypertext link and a user-friendly descriptor.

19. The system of claim 1, wherein a publishing component is configured to save the augmented data file at a desired second uniform resource locator address.

20. The system of claim 1, wherein a browser is configured to display the augmented data file when directed to the source data file.

21. A method of augmenting data from a source data file with data from a reference database, the method comprising:
    augmenting the source data file at a first instance, comprising:
        retrieving the source data file including a structured datum from a first address,
        identifying the structured datum,
        locating a reference datum from the reference database according to the identified structured datum,
        generating an association of the reference datum to the structured datum,
        augmenting the source data file with the generated association to create an augmented data file, and
        storing the augmented data file at a second address for subsequent display of the augmented data file in response to a request for the source data file;
    transmitting the augmented data file to a computing device;
    receiving an identifier at a second instance from the computing device corresponding to a pointer being positioned over the structured datum in the computing device;
    responsive to receiving the identifier, transmitting to the computing device additional information from the reference database according to the generated association, the additional information being displayable as an overlay in an area proximate to the structured datum simultaneous to the pointer being positioned over the structured datum; and
    responsive to receiving the identifier, updating the reference database to track the number of times a pointer is positioned over the structured datum.

22. The method of claim 21, wherein the first address is on a network.

23. The method of claim 22, wherein the network includes at least a portion of the Internet.

24. The method of claim 21, wherein retrieving the source data file includes retrieving a web page.

25. The method of claim 21, wherein locating the reference datum includes locating a uniform resource locator address.

26. The method of claim 21, wherein generating the association includes associating the structured datum to a uniform resource locator address.

27. The method of claim 26, wherein generating the association includes generating a user-friendly description of the data contained at the uniform locator address.

28. The method of claim 21, further comprising displaying the augmented data file in the computing device.

29. The method of claim 28, wherein displaying the augmented data file includes displaying the additional information simultaneously in an area proximate to the structured datum in response to a pointer being over the structured datum.

30. A method of augmenting structured data stored in a source data file with unstructured data stored in a reference database, comprising:
    augmenting the source data file at a first instance, comprising:
        reading a structured datum from the source data file,
        locating a reference datum in the reference database corresponding to the structured datum,
        generating an association of the reference datum to the structured datum, and
        augmenting the source data file with the generated association to create an augmented data file;
    transmitting the augmented data file to a computing device;
    receiving an identifier at a second instance from the computing device corresponding to a pointer being positioned over the structured datum in the computing device;
    responsive to receiving the identifier, transmitting to the computing device additional information from the reference database according to the generated association, the additional information being displayable in an area proximate to the structured datum simultaneous to the pointer being positioned over the structured datum; and
    responsive to receiving the identifier, updating the reference database to track the number of times a pointer is positioned over the structured datum.

31. The method of claim 30, wherein the source data file is stored on a network.

32. The method of claim 31, wherein the source data file is stored on the Internet.

33. The method of claim 30, wherein locating the reference datum includes locating a uniform resource locator address.

34. The method of claim 33, wherein locating the uniform resource locator address includes locating the uniform resource locator address for an advertisement.

35. The method of claim 30, wherein locating a reference datum in the reference database corresponding to the structured datum comprises locating the reference datum in the reference database corresponding to the structured datum according to an analyzing strategy.

36. The method of claim 35, wherein the analyzing strategy is locating a first text string in the structured datum and matching a second text string in the reference datum.

37. The method of claim 35, wherein the analyzing strategy comprises locating a first keyword in the structured datum to correspond to a second keyword in the reference datum.

38. The method of claim 35, wherein the analyzing strategy includes generating a first identifier to the structured datum and locating a second identifier in the reference datum matching the first identifier.

39. The method of claim 38, wherein the generating the first identifier is based upon a "fuzzy expert" search engine.

40. The method of claim 39, wherein generating the first identifier further includes retrieving a natural language text from the structured datum.

41. A system for associating data in a reference database with structured data in a source data file, comprising:
   means for augmenting the source data file at a first instance, comprising:
      means for reading a structured datum from the source data file,
      means for locating a reference datum in the reference database corresponding to the structured datum,
      means for generating an association of the reference datum to the structured datum, and
      means for augmenting the source data file with the generated association to create an augmented data file;
   means for transmitting the augmented data file to a computing device;
   means for receiving an identifier at a second instance from the computing device corresponding to a pointer being positioned over the structured datum in the computing device;
   means for transmitting to the computing device additional information from the reference database according to the generated association responsive to receiving the identifier, the additional information being displayable in an area proximate to the structured datum simultaneous to the pointer being positioned over the structured datum; and
   means for updating the reference database to track the number of times a pointer is positioned over the structured datum responsive to receiving the identifier.

42. The system of claim 41, wherein the source data file is stored on a network.

43. The system of claim 41, wherein the source data file is stored on the Internet.

44. The system of claim 43, wherein locating the reference datum includes locating a uniform resource locator address.

45. The method of claim 44, wherein locating the uniform resource locator address includes locating the uniform resource locator address for an advertisement.

46. The method of claim 41, wherein means for locating a reference datum in the reference database corresponding to the structured datum comprises means for locating the reference datum in the reference database corresponding to the structured datum according to an analyzing strategy.

47. The method of claim 46, wherein the analyzing strategy includes locating a first text string in the structured datum and locating a second text string in the reference datum matching the first text string.

48. The method of claim 46, wherein the analyzing strategy includes matching a first keyword in the structured datum to a second keyword in the reference datum.

49. The method of claim 46, wherein the analyzing strategy includes generating a first identifier to the structured datum and locating a second identifier in the reference datum matching the first identifier.

50. The method of claim 49, wherein the generating the first identifier is based upon a "fuzzy expert" search engine.

51. The method of claim 50, wherein generating the first identifier further includes retrieving a natural language text from the structured datum.

52. A computer software program stored on a computer-readable medium, the computer software program comprising:
   means for augmenting a source data file at a first instance, comprising:
      means for reading a structured datum from the source data file,
      means for locating a reference datum in a reference database corresponding to the structured datum,
      means for generating an association of the reference datum to the structured datum, and
      means for augmenting the source data file with the generated association to create an augmented data file;
   means for transmitting the augmented data file to a computing device;
   means for receiving an identifier at a second instance from the computing device corresponding to a pointer being positioned over the structured datum in the computing device;
   means for transmitting to the computing device additional information from the reference database according to the generated association responsive to receiving the identifier, the additional information being displayable in an area proximate to the structured datum simultaneous to the pointer being positioned over the structured datum; and
   means for updating the reference database to track the number of times a pointer is positioned over the structured datum responsive to receiving the identifier.

53. The computer software program of claim 52, wherein the source data file is stored on a network.

54. The computer software program of claim 53, wherein the source data file is stored on the Internet.

55. The computer software program of claim 53, wherein locating the reference datum includes locating a uniform resource locator address.

56. The computer software program of claim 55, wherein locating the uniform resource locator address includes locating the uniform resource locator address for an advertisement.

57. The computer software program of claim 52, wherein locating the reference datum in the reference database includes locating a reference datum corresponding to the structured datum according to an analyzing strategy.

58. The computer software program of claim 57, wherein the analyzing strategy is locating a first text string in the structured datum and matching a second text string in the reference datum.

59. The computer software program of claim 57, wherein the analyzing strategy comprises matching a first keyword in the structured datum to a second keyword in the reference datum.

60. The computer software program of claim 57, wherein the analyzing strategy is generating a first identifier to the structured datum and locating a second identifier in the reference datum matching the first identifier.

61. The computer software program of claim 60, wherein generating the first identifier is based upon a "fuzzy expert" search engine.

62. The computer software program of claim 60, wherein generating the first identifier further includes retrieving a natural language text from the structured datum.

63. A software program stored on a computer-readable medium for augmenting data from a source data file with data from a reference database to generate an augmented data file, comprising:
 a reference database component configured to include a reference datum;
 a handler component configured to retrieve the source data file, the source data file including a structured datum;
 a locator component configured to locate the structured datum in the source data file;
 an analyzer component configured to associate the structured datum to the reference datum to create an association according to an analyzing strategy; and
 a generating component configured to embed the association of the structured datum to the reference datum in the source data file to generate the augmented data file at a first instance; and
 a communication component configured to transmit additional information, wherein:
  the communication component transmits the augmented data file to a computing device,
  receives an identifier at a second instance from the computing device corresponding to a pointer being positioned over the structured datum in the computing device,
  responsive to receiving the identifier, transmits to the computing device additional information from the reference database component according to the association, the additional information being displayable as an overlay in an area proximate to the structured datum simultaneous to the pointer being positioned over the structured datum, and
  responsive to receiving the identifier, updates the reference database to track the number of times a pointer is positioned over the structured datum.

64. The software program of claim 63, wherein the source data file is stored at an address on a network.

65. The software program of claim 64, wherein the network is a public network.

66. The software program of claim 64, wherein the network is the Internet.

67. The software program of claim 64, wherein the structured datum includes a formatted webpage.

68. The software program of claim 63, wherein the reference datum includes a first uniform resource locator address.

69. The software program of claim 68, wherein the first uniform resource locator address is the location of an advertisement.

70. The software program of claim 68, wherein the reference datum includes a second identifier associated with the first uniform resource locator address.

71. The software program of claim 70, wherein the first uniform resource locator address is further associated with a user-friendly descriptor.

72. The software program of claim 70, wherein the additional information comprises a hyperlink and a user-friendly descriptor, the user-friendly descriptor being associated with the associated first uniform resource locator address.

73. The software program of claim 68, wherein the analyzer component is further configured:
 to generate a first identifier based upon the structured datum;
 to locate the second identifier to corresponding to the first identifier; and
 to associate the first uniform resource locator address with the structured datum.

74. The software program of claim 73, wherein the first identifier is a first text string.

75. The software program of claim 74, wherein the first text string includes keywords.

76. The software program of claim 75, wherein the second identifier is a second text string.

77. The software program of claim 73, wherein the analyzer is further configured to locate the second identifier to corresponding to the first identifier based upon an analyzing strategy.

78. The software program of claim 77, wherein the analyzing strategy includes matching the first text string with the second text string and further associating the first uniform resource locator address with the first text string.

79. The software program of claim 78, wherein the analyzing strategy generates the first identifier by means of a "fuzzy expert" search engine.

80. The software program of claim 78, wherein the analyzing strategy generates the first identifier by means of a natural language search engine.

81. The software program of claim 63, wherein a publishing component is configured to save the augmented file at a desired second uniform resource locator address.

82. The software program of claim 63, wherein a browser is configured display the augmented data file when directed to the source data file.

* * * * *